Patented Oct. 1, 1935 2,016,012 

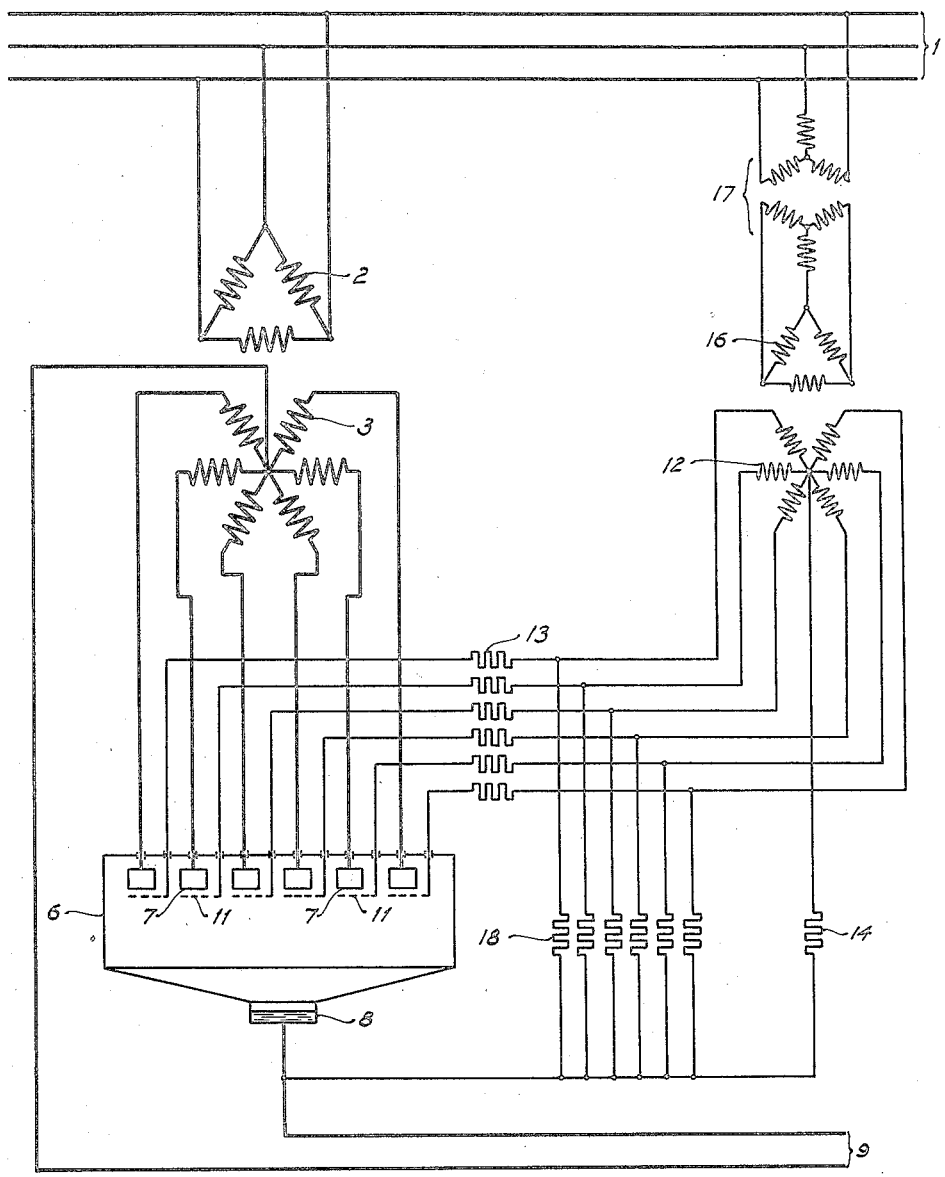

UNITED STATES PATENT OFFICE 2,016,012

ELECTRIC CURRENT CONVERTING SYSTEM

Erwin Kern, Wettingen, Switzerland, assignor to Aktiengesellschaft Brown Boveri & Cie., Baden, Switzerland, a joint-stock company of Switzerland Application April 22, 1931, Serial No. 532,107
In Germany April 28, 1930

3 Claims. (Cl. 175—363)

This invention relates to improvements in systems for transmitting electric energy from a direct-current circuit to an alternating current circuit by means of controlled electric valves.

The devices heretofore known and used as electric valves for the transmission of electric energy from a direct-current network to a polyphase alternating-current network, are generally limited to low currents and small loads. Hot cathode vacuum tubes were generally used heretofore as the valves in systems for the above purpose. Such tubes require separate heating means for the cathode and the electron emission therein does not depend on the formation of a cathode spot. Tubes with mercury or other volatile metal cathodes have also been suggested for use to accomplish the above purpose either singly or jointly with hot cathode tubes. If hot cathode tubes are used as the electric valves, the load transmissible is limited by their current saturation and when controlled metallic vapor tubes such as mercury cathode tubes are used, a safe and satisfactory operation of the control grids is unobtainable at high anode current.

Disturbances in operation of systems for the purpose above set forth due to failure of the grids to block the arc action are caused by oscillations in the grid circuits. The main arc, during operation at heavy load i. e. large anode currents, causes the characteristic of the arc struck between the grid and the cathode to become unstable thereby also giving rise to oscillations in the control grid circuits.

It is, therefore, among the objects of the present invention to provide a system for the transmission of electric energy from a direct current network to a polyphase alternating current network with the use of a controlled valve of the metallic vapor arc type.

Another object of the invention is to provide a system for the transmission of electric energy from a direct current network to a polyphase alternating current network with the use of a valve of the metallic vapor arc type which is so controlled as to avoid oscillations in the control grid circuits.

Another object of the invention is to provide a system for the transmission of electric energy from a direct current network to a polyphase alternating current network with the use of a grid controlled valve of the metallic vapor arc type in which ohmic resistances are connected in the grid circuit to increase the damping thereof and thereby to suppress electrical oscillations therein.

Objects and advantages, other than those above set forth, will be apparent from the following description when read in connection with the accompanying drawing which diagrammatically illustrates one embodiment of the present invention.

Referring more particularly to the drawing by characters of reference, the reference numeral 2 designates the delta connected secondary winding of a transformer connected with the respective phase conductors of an alternating current line 1, connected with an alternating current conductor (not shown) or other means operating to determine the wave shape and frequency of the voltage thereof. The star connected primary winding 3 is connected with an electric valve in the form of a metallic vapor arc rectifier comprising a metallic tank 6 having a plurality of anodes 7 extending thereinto and retaining a pool of a volatile metal such as mercury shown at 8. The neutral point of the transformer primary winding 3 is connected with one side and the cathode 8 is connected with the other side of a direct current supply line 9.

A grid 11, for the purpose of controlling the attachment of the arc on the anode, is arranged directly adjacent each of the anodes. Each of the grids 11 is connected with the star connected secondary winding 12 of a transformer through resistances 13. The neutral point of the secondary winding 12 is connected with the cathode 8 through a conductor which may, preferably, include a serially connected resistance 14. The delta connected primary winding 16, forming a portion of the transformer having the secondary winding 12, is connected through a phase shifter 17 with the alternating current line 1 to be supplied.

A plurality of ohmic resistances 18 are severally connected with the phase sections of the secondary winding 12 and the cathode 8 and serve to increase the damping of the grid circuits thereby avoiding the occurrence of oscillation in the grid circuit. The grids 11 are supplied with potential from the transformer 12, 16 and the phase shifter 17, during operation, in such manner as to be positive relative to the cathode 8 at the moment when the alternating voltage opposes (by action of the apparatus determining the wave shape and frequency of the voltage of the line 1) the direct voltage and is substantially equal thereto. Such result is readily obtained by proper adjustment of the phase shifter 17. It is also to be noted that resistances 18 provide a